United States Patent
Zhang et al.

(10) Patent No.: US 7,203,349 B2
(45) Date of Patent: Apr. 10, 2007

(54) BRONCHIAL WALL THICKENING RECOGNITION FOR REDUCED FALSE-POSITIVES IN PULMONARY NODULE DETECTION

(75) Inventors: Li Zhang, Plainsboro, NJ (US); Li Fan, Plainsboro, NJ (US); Jianzhong Qian, Princeton Junction, NJ (US); Guo-Qing Wei, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 1087 days.

(21) Appl. No.: 10/059,848

(22) Filed: Jan. 29, 2002

(65) Prior Publication Data

US 2003/0144598 A1    Jul. 31, 2003

(51) Int. Cl.
   *G06K 9/00*    (2006.01)
(52) U.S. Cl. .................. 382/128; 128/922; 378/4
(58) Field of Classification Search ............... 382/128, 382/131, 132, 100, 130; 128/922; 378/4–27
   See application file for complete search history.

(56) References Cited

U.S. PATENT DOCUMENTS

| | | | |
|---|---|---|---|
| 6,141,437 A * | 10/2000 | Xu et al. ............... | 382/130 |
| 6,549,646 B1 * | 4/2003 | Yeh et al. ............... | 382/132 |
| 2001/0044576 A1 * | 11/2001 | Vining ................... | 600/416 |
| 2002/0164060 A1 * | 11/2002 | Paik et al. ............... | 382/128 |
| 2002/0193687 A1 * | 12/2002 | Vining et al. ............ | 600/425 |
| 2003/0095696 A1 * | 5/2003 | Reeves et al. ........... | 382/131 |
| 2003/0105395 A1 * | 6/2003 | Fan et al. ................. | 600/425 |

OTHER PUBLICATIONS

Fan L. et al. "Automatic Detection of Lung Nodules From Multi-Slice Low-Dose CT Images," *Proceedings of the Spie*, vol. 4322, pp. 1828-1835 XP008022813.
P. Armstrong, A. G. Wilson, P. Dee, D.N. Hansell, "Imaging of Diseases of the Chest" *Mosby*, XP002266478 3rd edition, chapter 4, pp. 152-153.
Thinh V. Nguyen, Jack Sklansky, "Computing the Skeleton of Coronary Arteries in Cineangiograms," *computers and Biomedical Research*, Academic Press, Inc. vol. 19, 1986, pp. 428-444 XP008024914.
Chabat F. et al., << ERS Transform for the Automated Detection of Bronchial Abnormalities on CT of the Lungs, >> *IEEE Trnasactions on Medical Imaging, IEEE Inc.* vol. 20 No. 9 2001, pp. 942-952 XP001100471.
Milan Sonka, Gopal Sundaramoorthy, Eric A. Hoffman, "Knowledge-Besed Segmentation of Intrathoracic Airways from multidimensional High Resolution CT Images," *Proceedings SPIE, Medical Imaging 1994, Physiology and Function From Multidimensional Images*, 1994, pp. 73-85, XP008024795.

(Continued)

*Primary Examiner*—Jingge Wu
*Assistant Examiner*—Anand Bhatnagar
(74) *Attorney, Agent, or Firm*—Donald B. Paschburg; F. Chau & Associates, LLC

(57) ABSTRACT

A system and method for automatically reducing false-positive nodule candidates associated with airways includes receiving a nodule candidate, testing for airway cavities connected to the candidate, and recognizing the candidate as a false-positive nodule candidate if it is connected to an airway cavity; where the testing may include perpendicular testing for airways that are relatively perpendicular to an examination plane and parallel testing for airways that are relatively parallel to an examination plane.

22 Claims, 10 Drawing Sheets

OTHER PUBLICATIONS

Maryellen L. Giger, Kyongtae T. Bae, Heber Macmahon, "Computerized Detection of Pulmonary Nodules in Computed Tomography Images," *Investigative Radiology*, vol. 29, No. 4 1994, pp. 459-465, XP008024742.

Hoffman A. Eric, "Physiology and Function from Multidimensional Images," *Proceedings SPIE—The International Society for Optical Engineering*, vol. 2168 1994.

International Search Report.

* cited by examiner

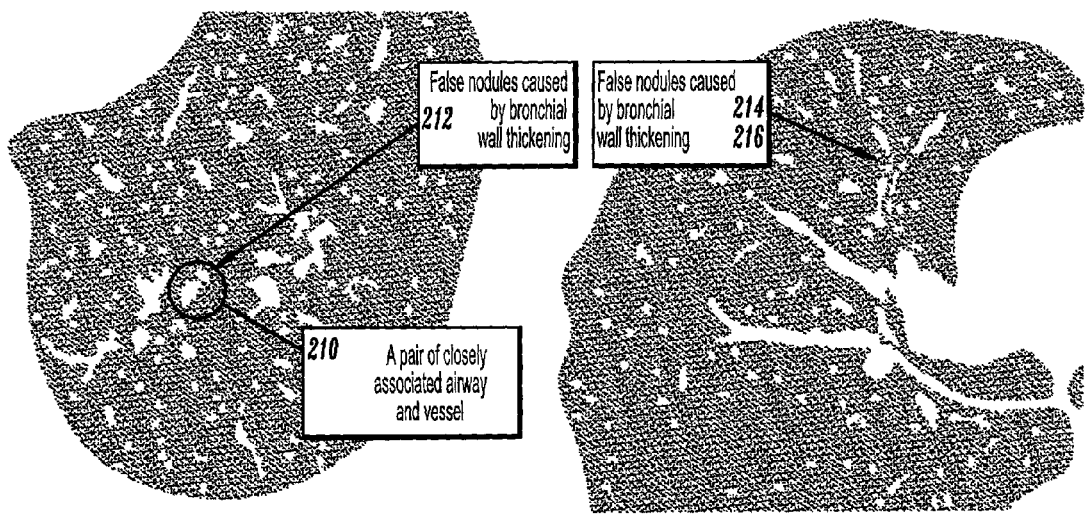
FIG. 2A  FIG. 2B
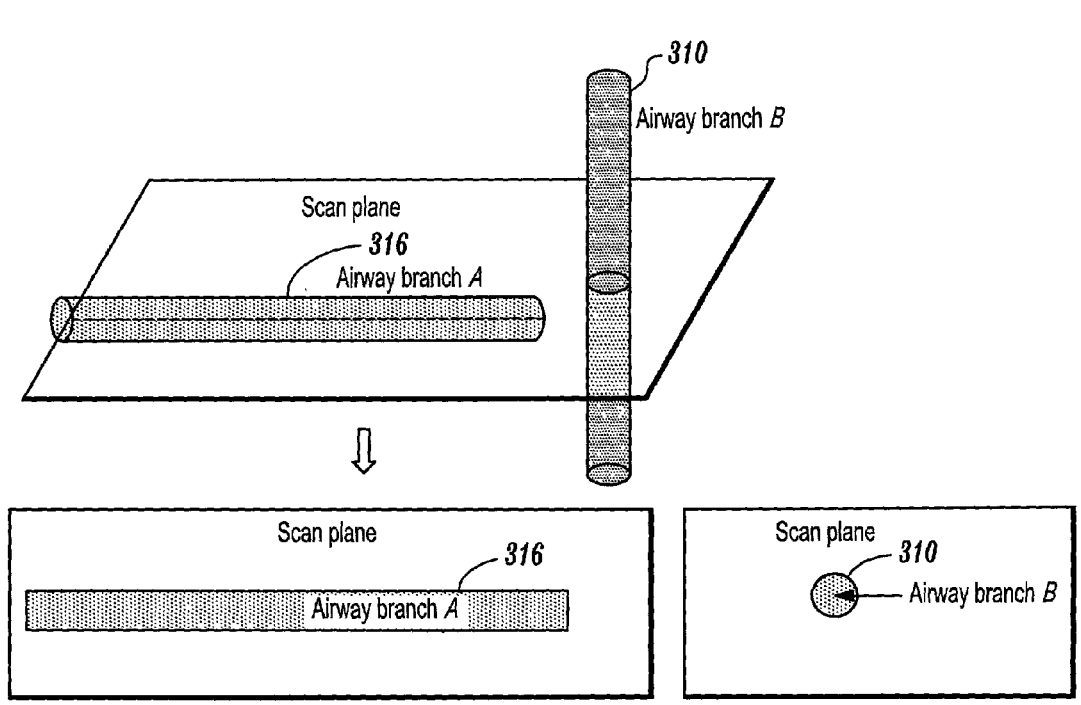
FIG. 3

BRONCHIAL WALL THICKENING RECOGNITION FOR REDUCED FALSE-POSITIVES IN PULMONARY NODULE DETECTION

CROSS-REFERENCE TO RELATED APPLICATIONS

This application is related to the disclosure of co-pending Ser. No. 10/008,133 entitled "Vessel-Feeding Pulmonary Nodule Candidate Generation", filed on Dec. 5, 2001, commonly assigned herewith, the disclosure of which is incorporated by reference herein in its entirety. This application is also related to the disclosure of co-pending Ser. No. 10/008,119 entitled "Vessel-Feeding Pulmonary Nodule Detection By Volume Projection Analysis", filed on Dec. 5, 2001, commonly assigned herewith, the disclosure of which is incorporated by reference herein in its entirety.

BACKGROUND

Pulmonary or lung cancer is currently a leading cause of cancer death. Early detection of cancer-related pulmonary nodules may provide the greatest chance to prevent deaths due to lung cancer. Non-invasive, high-resolution, thin-slice, multi-slice or multi-detector computed tomography ("CT") scanners are capable of providing vast quantities of detailed imaging data on anatomical structures. Therefore, non-invasive early detection of pulmonary nodules from CT images holds great promise.

Unfortunately, although CT screening provides a means to detect small nodules in the early stages, large amounts of CT data expose the weaknesses of existing automatic nodule detection methods that typically have high false-positive ratios. The false-positive ratio is an important consideration for automatic nodule detection, and as such, it is desirable to reduce the false-positive ratio for automatic lung nodule detection.

SUMMARY

These and other drawbacks and disadvantages of the prior art are addressed by a system and method for automatically reducing false-positive nodule candidates associated with airways that includes receiving a nodule candidate, testing for airway cavities connected to the candidate, and recognizing the candidate as a false-positive nodule candidate if it is connected to an airway cavity; where the testing may include perpendicular testing for airways that are relatively perpendicular to an examination plane and parallel testing for airways that are relatively parallel to an examination plane.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches an approach to reducing false-positives for pulmonary nodule detection.

FIGS. 2A and 2B show CT image diagrams with false-positive nodules resulting from bronchial wall thickening for two typical airways;

FIG. 3 shows a schematic diagram for two extreme cases of airway appearance on scan planes;

DETAILED DESCRIPTION OF PREFERRED EMBODIMENTS

The growing interest in automated lung nodule detection from computed tomography ("CT") images demands a reduction of the false-positive ratios for automatic detection methods. The present disclosure teaches a technique for reducing false-positives by recognizing the bronchial wall thickening that often leads to false-positive results in nodule detection.

In an automated lung nodule detection system, false-positive results are often caused by bronchial wall thickening due to a partial volume effect. For example, Fan et al reported, in "Automatic Detection of Lung Nodules from Multi-Slice Low-Dose CT Images" that there were 41 false nodules in 112 automatically detected nodules, wherein 16 of the 41 false-positives were clearly associated with bronchial wall thickening (Li Fan, Carol L. Novak, Jian-Zhong Qian, Gerhard Kohl, and David P. Naidich, *Proceedings of SPIE Medical Imaging* 2001, vol. 4322, Part Three, 2001, pp. 1828–1835).

Accordingly, a bronchial wall thickening detection technique incorporated into existing automatic nodule detection systems causes the false-positive ratio to be substantially reduced. The present disclosure teaches an automatic bronchial wall thickening detection module that can be used with current nodule detection systems as a false-positive filter to identify the nodule candidates caused by bronchial wall thickening.

Figure 1:
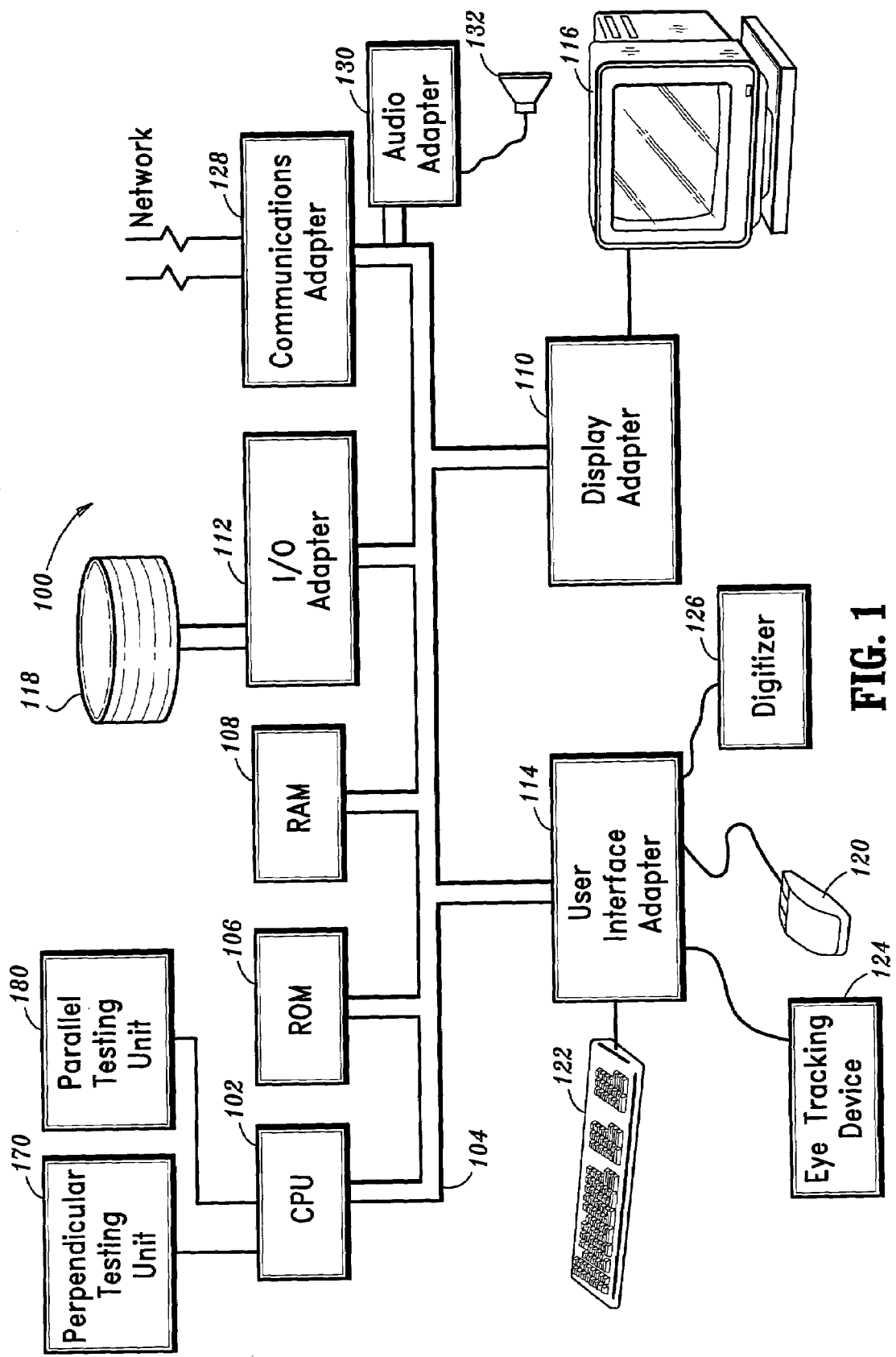
FIG. 1 shows a block diagram of a system for automatically recognizing bronchial wall thickening from CT images according to an illustrative embodiment of the present disclosure.

FIG. 1 shows a block diagram of a system 100 for automatically detecting pulmonary nodules from CT images, according to an illustrative embodiment of the present disclosure. The system 100 includes at least one processor or central processing unit ("CPU") 102 in signal communication with a system bus 104. A read only memory ("ROM") 106, a random access memory ("RAM") 108, a display adapter 110, an I/O adapter 112, and a user interface adapter 114 are also in signal communication with the system bus 104.

A display unit 116 is in signal communication with the system bus 104 via the display adapter 110. A disk storage unit 118, such as, for example, a magnetic or optical disk storage unit, is in signal communication with the system bus 104 via the I/O adapter 112. A mouse 120, a keyboard 122, and an eye tracking device 124 are also in signal communication with the system bus 104 via the user interface adapter 114. The mouse 120, keyboard 122, and eye-tracking device 124 are used to aid in the detection of suspicious regions in a digital medical image.

A perpendicular testing unit 170 and a parallel testing unit 180 are included in the system 100 and in signal communication with the CPU 102 and the system bus 104. While the perpendicular testing unit 170 and the parallel testing unit 180 are illustrated as coupled to the at least one processor or CPU 102, these components are preferably embodied in computer program code stored in at least one of the memories 106, 108 and 118, wherein the computer program code is executed by the CPU 102.

The system 100 may also include a digitizer 126 in signal communication with the system bus 104 via a user interface adapter 114 for digitizing a CT image of the lungs. Alternatively, the digitizer 126 may be omitted, in which case a digital CT image may be input to the system 100 from a network via a communications adapter 128 in signal communication with the system bus 104, or via other suitable means as understood by those skilled in the art.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the perpendicular testing unit 170 and the parallel testing unit 180, as well as the other elements of the system 100, while practicing within the scope and spirit of the present disclosure.

Turning now to FIGS. 2A and 2B, CT images are shown with false-positive nodules resulting from bronchial wall thickening for two typical airways. In an automated lung nodule detection system, false-positive results are often caused by bronchial wall thickening due to the partial volume effect.

For a nodule candidate, if it is recognized that an airway cavity is connected to it, it can then be determined whether the result was caused by bronchial wall thickening in order to separate the false-positive candidate from true nodule candidates. Therefore, this disclosure teaches detection of airway cavities connected to nodule candidates. The method uses two different approaches to identify two types of airway branches, which are based on geometric and gray level feature analysis of airways appearing in CT images. In FIG. 2A, a pair of closely associated airway and vessel 210 are seen to be connected to a false-positive nodule 212, where the pair 210 is perpendicular to an examination or scan plane (here, plane of page). In FIG. 2B, a false-positive nodule 214 is shown where its airway 216 is parallel to the scan plane. In the system and method for automatically recognizing two types of airway branches based on their associated geometric features, which appear on viewing planes in CT images, the features are identified by means of a perpendicular test and/or a parallel test.

As shown in FIG. 3, the tube-like airway branches 310 and 316 are shown on slices in CT images with different appearances depending on the cutting angle between the scan planes and the airway branches. Two extreme cases are given in FIG. 3: Airway "B" 310 is perpendicular to the scan plane, and Airway "A" 316 is parallel to the scan plane.

Most airway branches appear on scan planes between those two extreme cases. Based on the cutting angles, the airway branches are divided into two types. First, if the axis direction of an airway branch is close to the perpendicular direction of the scan plane, the appearance on the scan plane is a disk or an ellipse surrounded by the airway wall. Second, if the axis direction of an airway branch is close to the parallel direction of the scan planes, the appearance on the scan plane is a strip with two nearly parallel airway walls.

Returning now to FIGS. 2A and 2B, these figures give the two types of airways from real CT images. In FIG. 2A, the airway branch in pair 210 is perpendicular or nearly perpendicular to the scan plane; while in FIG. 2B, the airway branch 216 is parallel or nearly parallel to the scan plane.

Figure 4:
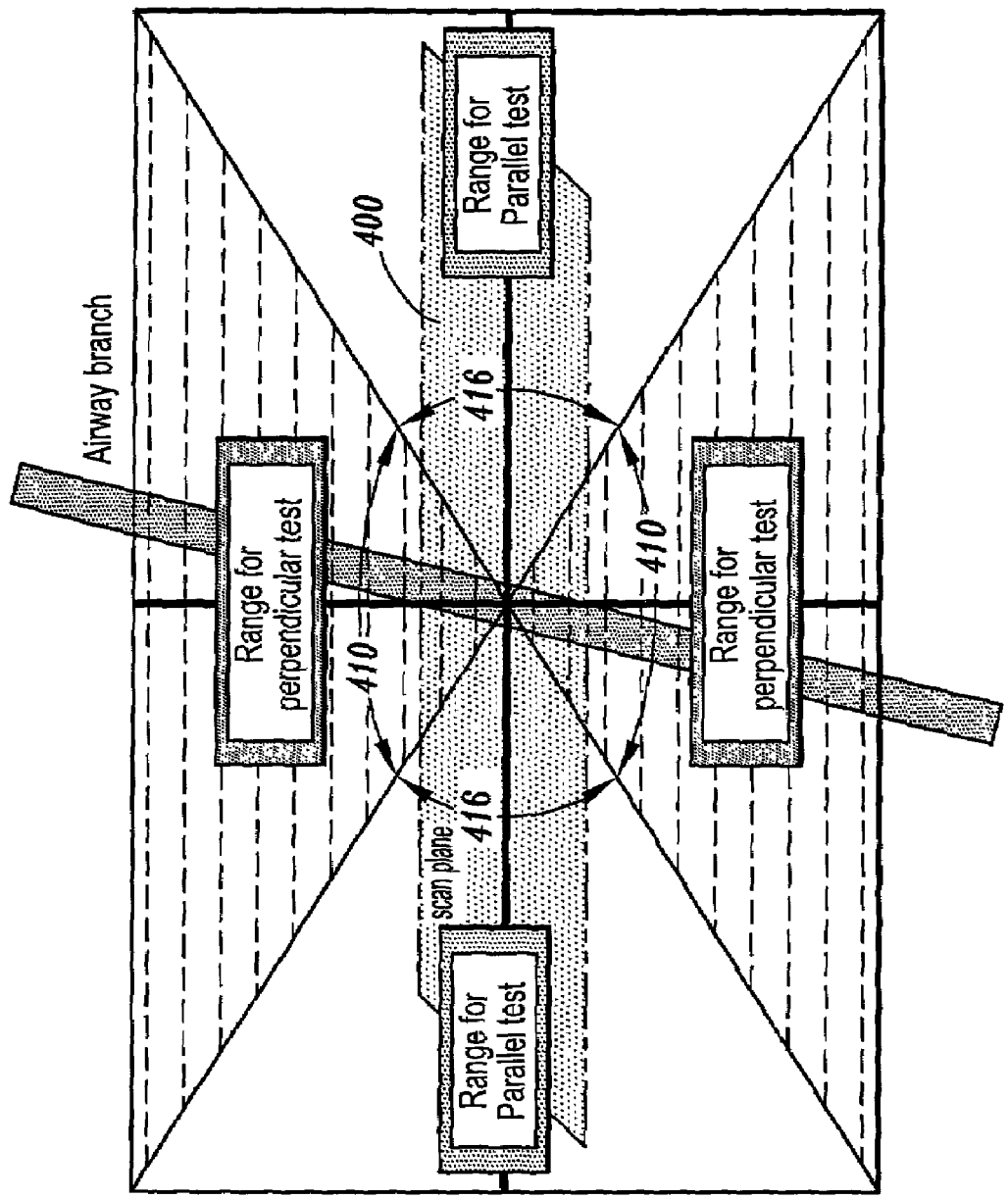
FIG. 4 shows a plot of airway branch orientation relative to a scan plane.

Turning now to FIG. 4, two different approaches are used to detect two types of airway branches because of the different geometric features of each. The first approach, called perpendicular testing, detects airway branches that are perpendicular or nearly perpendicular to the scan plane 400 using features derived from perpendicular airways. Similarly, the second approach is called parallel testing and recognizes parallel or nearly parallel airways. FIG. 4 illustrates the cutting angle ranges 410 for the perpendicular test and 416 for the parallel test.

Figure 5:
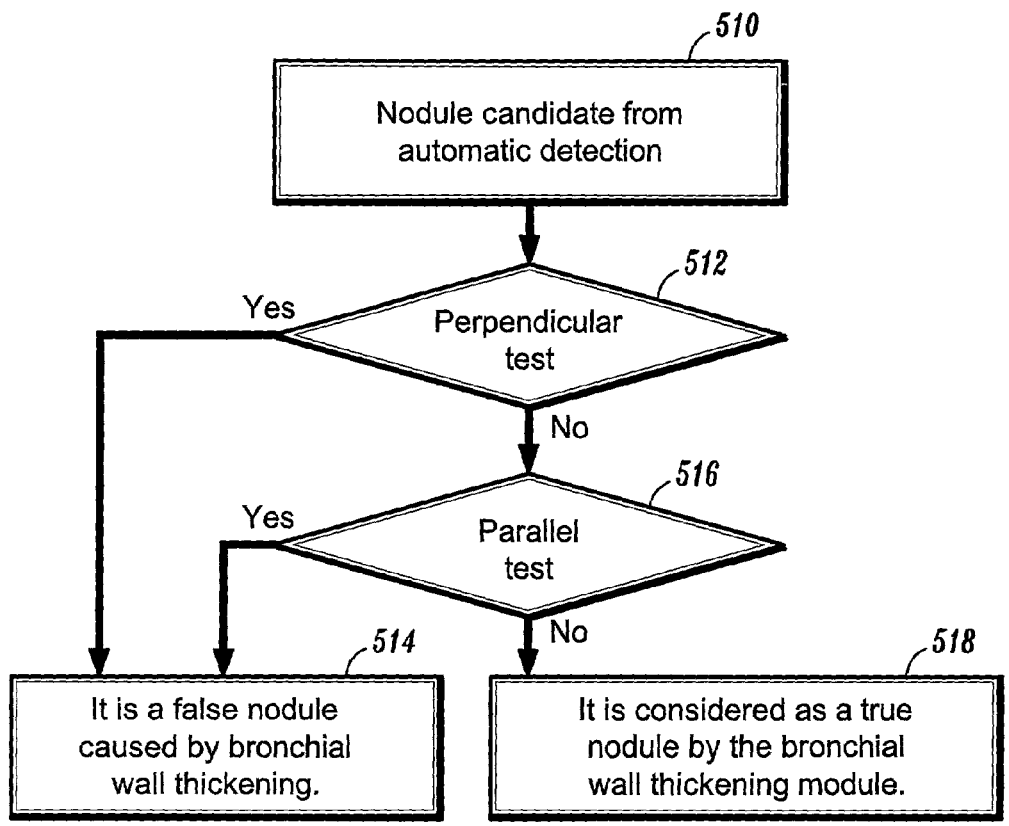
FIG. 5 shows a flow diagram for automatically recognizing false-positive nodules from CT images according to an illustrative embodiment of the present disclosure.

As shown in FIG. 5, perpendicular and parallel testing is performed for each nodule candidate. Function block 510 receives a nodule candidate, such as, for example, a nodule candidate resulting from the method of co-pending Ser. No. 10/008,133 entitled "Vessel-Feeding Pulmonary Nodule Candidate Generation". Decision block 512 executes a perpendicular test to determine whether the candidate is merely part of a relatively perpendicular airway wall. If the test result is true, the candidate is classified at function block 514 as a false-positive nodule due to bronchial-wall thickening. If the result of decision block 512 is negative, decision block 516 executes a parallel test to determine whether the candidate is merely part of a relatively parallel airway wall. If this test result is true, the candidate is marked at function block 514 as a false-positive nodule due to bronchial-wall thickening. If the result of decision block 516 is negative, the candidate is classified at function block 518 as a potentially true nodule. Thus, if either the perpendicular test or the parallel test leads to a decision that this nodule candidate is located on an airway, the candidate is considered as a false-positive.

Figure 6:
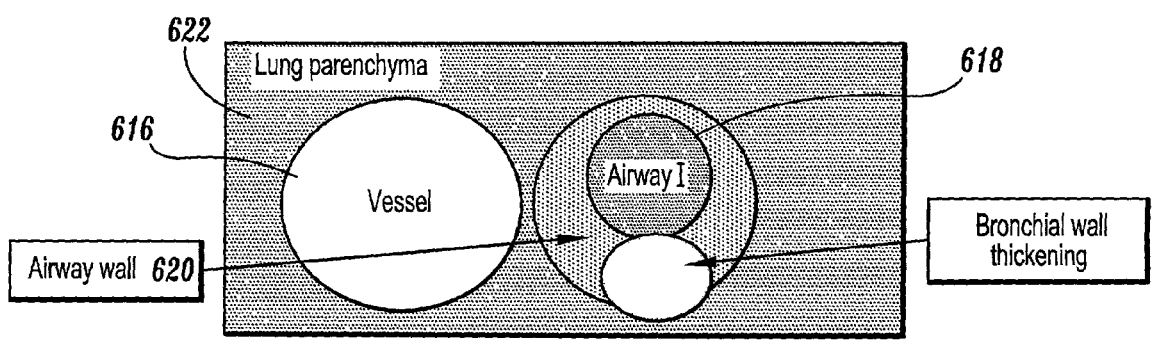
FIG. 6 shows a schematic diagram of anatomic airway features.

As shown in FIG. 6, anatomical features of airways are used for testing. The perpendicular testing searches relatively perpendicular airways in a Region of Interest ("ROI") by using the following anatomic knowledge: 1) Airway 618 lumens are dark regions in CT images; 2) Airway lumens are surrounded by relatively bright airway walls 620 in CT images; 3) Airways 618 and vessels 616 are often closely associated and branch in parallel while vessels 616 are much brighter in comparison with airway 618 lumen and lung parenchyma 622. For example, FIG. 2A shows an exemplary pair 210 having a closely associated airway and vessel in a real CT image.

Figure 7:
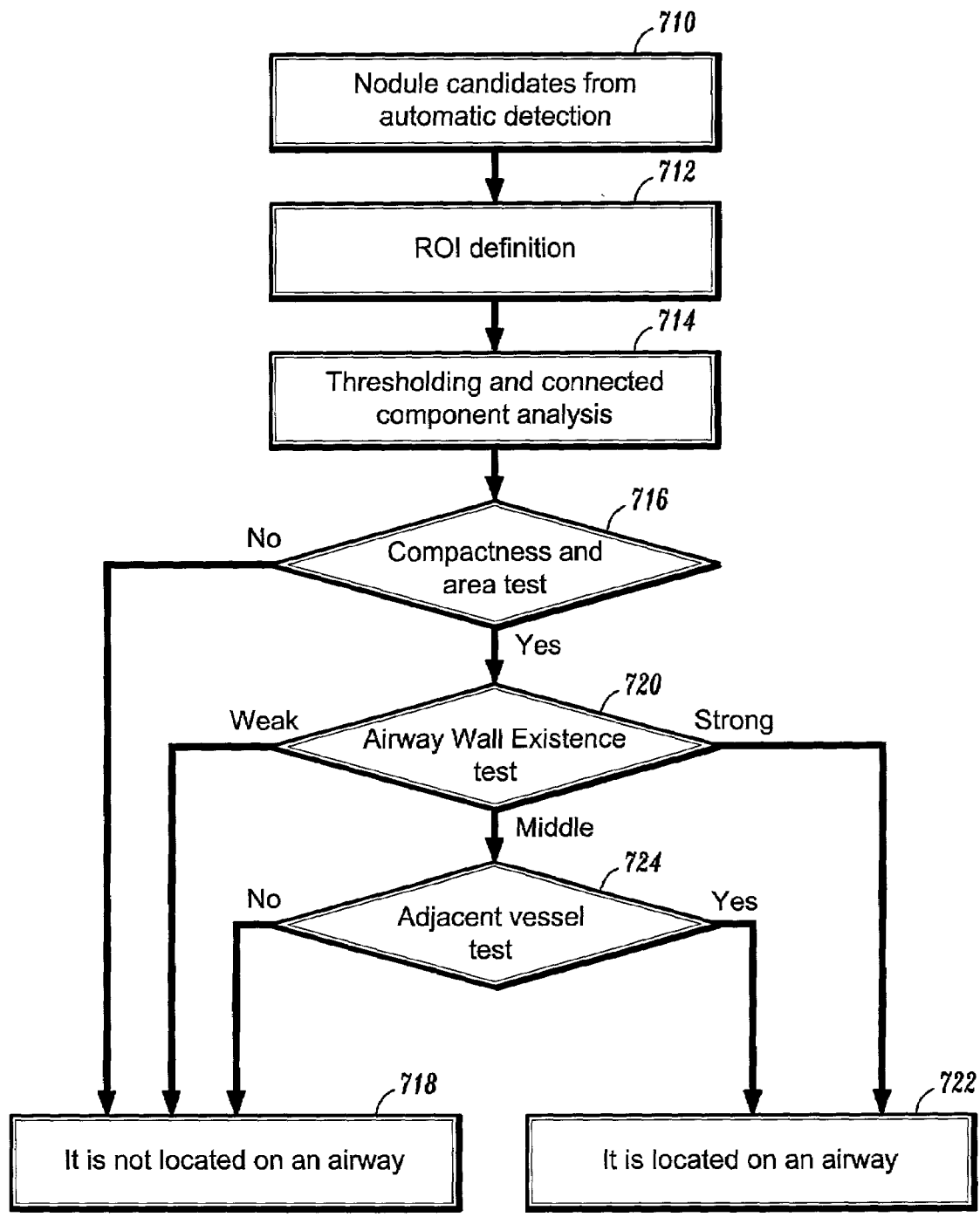
FIG. 7 shows a flow diagram for performing a perpendicular test in an airway direction.

Turning now to FIG. 7, a perpendicular test 512 of FIG. 5 is shown in greater detail. Nodule candidates are received at function block 710. The ROI is defined at function block 712 for the airway detection procedure based on the position of a nodule candidate being examined. At function block 714, the ROI is thresholded with a predefined threshold, and a connected component analysis is used to obtain airway candidates. Decision block 716 compares the compactness and area of these candidates with heuristic values for airways. If the test is false, function block 718 classifies the candidate as not located on an airway, typically by returning a logical false. If the result of block 716 is true, function block 720 performs an airway wall existence test to classify the probability of the candidate being part of an airway wall. If the probability is "weak", control is passed to the above-described block 718. If the probability is "strong", control is passed to function block 722 to classify the candidate as located on an airway, typically by returning a logical true. However, if the probability is "middle", an additional adjacent vessel test is performed at decision block 724. If block 724 detects an adjacent vessel, the candidate is classified as located on an airway by the above-described block 722. If block 724 does not detect an adjacent vessel, the candidate is classified as not located on an airway by the above-described block 718. Thus, the distance to the potential airway from the nearest vessel are combined together to make a final decision about whether the nodule candidate is located on an airway relatively perpendicular to the scan plane.

In the above perpendicular test, a predefined global threshold is first selected to segment out possible airway voxels. In X-ray CT images, the Hounsfield number for air is −1000 HU. To take into account the partial volume effect, the threshold for airway lumens is approximately −874 HU in this exemplary embodiment, although other comparable values may be used in alternate embodiments. After thresholding, a connected component analysis is used to obtain regions that consist of mostly air, which become airway region candidates.

Figure 8:
FIG. 8 shows enlarged original images and thresholded images illustrating compactness and area testing.

Turning now to FIG. 8, two geometric features, namely compactness and area, are used in the perpendicular test to check airway region candidates. Here, an image 810 is thresholded using $T_{airway}$ of −874 HU to produce a thresholded image 812. A nodule candidate 814 is found in both images. If an airway branch is perpendicular or nearly perpendicular to a scan plane, its appearance on the scan plane should be a disk or ellipse. Both disks and ellipses are highly compacted shapes. If compactness is defined as (perimeter)$^2$/area, disks and ellipses should have relatively small compactness numbers. If a dark region has a large compactness number, it is very likely that this region is an arbitrary-shaped lung parenchyma region, or a relatively parallel airway region. The area of airway regions is limited in a certain range to exclude random noises with small areas and lung parenchyma regions with large areas.

Here, the airway region 816 is highly compact with a satisfactory area value. However, a further test is required in order to conclude that the airway region 816 is truly an airway region.

Another image 818 is thresholded to produce the thresholded image 820. The images 818 and 820 include a different nodule candidate 822, and no connected airway regions are present. Accordingly, the nodule candidate 822 is a true-positive nodule candidate.

After compactness and area tests, potential airway regions are present. True airway regions must be distinguished from the potential ones by checking for airway wall existence. The airway region should be enclosed by a bright airway wall. That means that the pixels on the outer boundaries of the airway region should have high Hounsfield numbers. However, most airway branches with bronchial wall thickening, which are considered as nodule candidates in the previous steps, are relatively small. Thus, their walls may not necessarily be complete due to the partial volume effect. The confidence level for wall existence is labeled according to one of three descriptions: 1) If the number of bright pixels over the total number of outer boundary pixels is greater than a certain predefined value, for example 80%, the wall existence is "strong"; 2) If the number of dim pixels over the total number is greater than a certain predefined value, for example 50%, the wall existence is "weak"; 3) If the wall existence cannot be labeled with strong or weak, the wall existence is "middle".

If the wall existence confidence of an airway region candidate is strong or weak, a decision can be made as to whether it is an airway region at this step. The nodule candidate 814 has a connected airway region 816 with a strong confidence level. Therefore, the candidate 814 is a false-positive nodule candidate.

Figure 9:
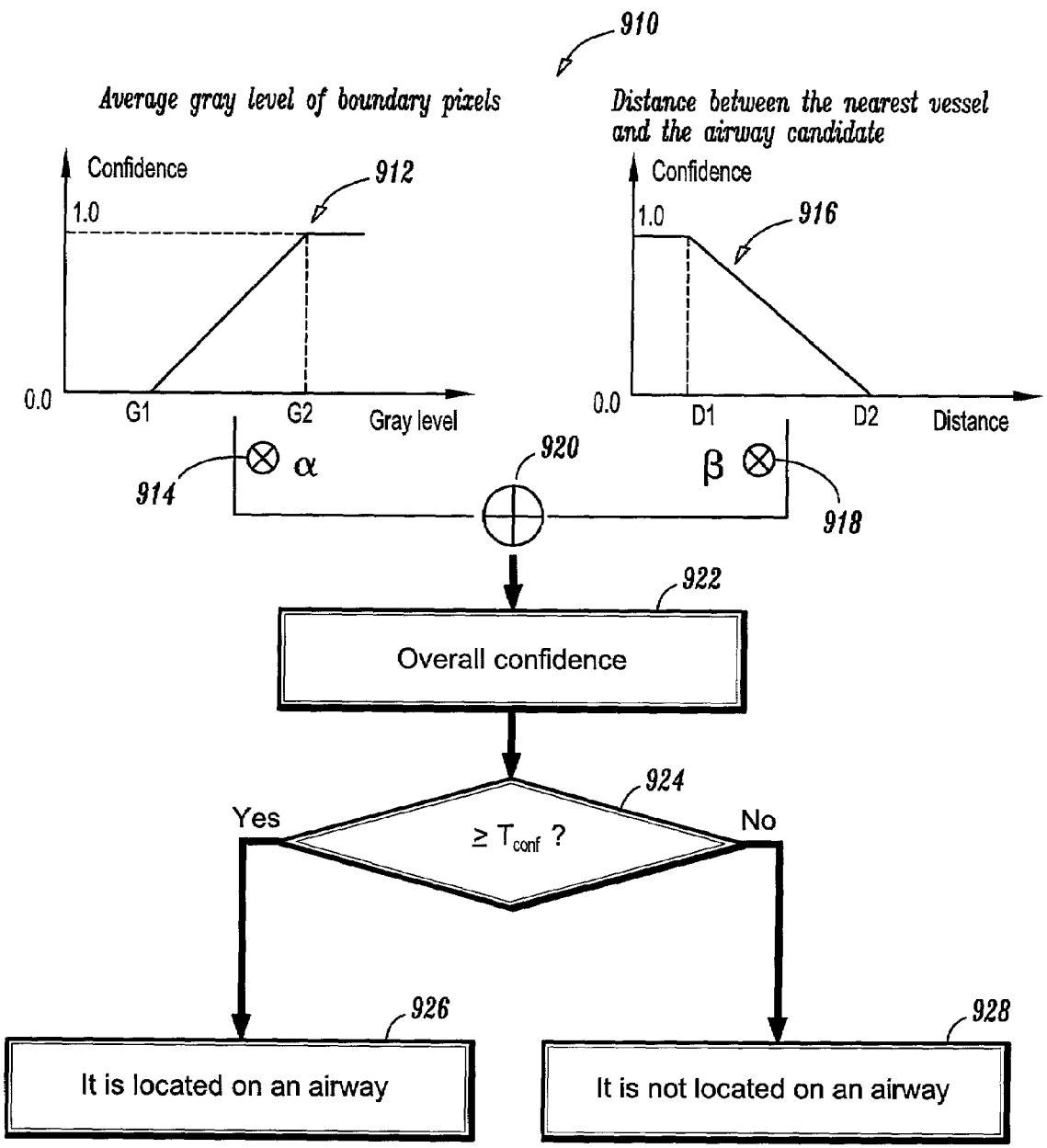
FIG. 9 shows a flow diagram for using adjacent vessel information in combination with an indeterminate perpendicular test.

As shown in FIG. 9, if the wall existence measure is middle, an additional adjacent vessel test needs to be performed in order to make a good decision. Based upon the fact that airways are often accompanied by adjacent vessels, the system detects vessels in the ROI and calculates the distance between the vessels and the airway candidate to assist decision making for airway existence. The Hounsfield number for vessels in CT images can be approximated by the Hounsfield number for water, which is 0 HU. Thus, vessel regions should be bright relative to lung parenchyma. Furthermore, the area of vessel regions is preferably in a range chosen to exclude random noise and chest wall regions.

If the evidence from airway wall existence is not strong enough or weak enough to make a decision, the adjacent vessel existence test is used. The gray level of airway wall in CT images can vary in a large range. Therefore, to achieve noise insensitive and robust results, a decision is made by combining the confidence numbers of airway wall existence and of adjacent vessel existence in this case.

Accordingly, in the flow diagram 910, a gray-level confidence function 912, based on the average gray level of boundary pixels, is scaled by weighting factor alpha at multiplier 914. In the function 912, G1 and G2 are gray level thresholds for airway wall detection. G1 and G2 are approximately 224 HU and 424 HU, respectively, in this exemplary embodiment, although other comparable values may be used in alternate embodiments. A distance confidence function 916, based on the distance between the nearest vessel and the airway candidate, is scaled by weighting factor beta at multiplier 918. In the function 916, D1 and D2 are distance thresholds for the adjacent vessel test. D1 and D2 are approximately 2.0 mm and 4.5 mm, respectively, in this exemplary embodiment, although other comparable values may be used in alternate embodiments. A summing junction 920 receives the weighted confidence levels from the multipliers 914 and 918, and provides the raw level to an overall confidence function 922. A decision block 924 receives the overall confidence level and determines whether it is greater than or equal to a threshold value $T_{conf}$ which is approximately 0.75 in this exemplary embodiment, although other comparable values may be used in alternate embodiments. If the overall confidence is not less than $T_{conf}$ function block 926 determines that the candidate is located on an airway. If the overall confidence is less than $T_{conf}$ function block 928 determines that the candidate is not located on an airway.

Figure 10:
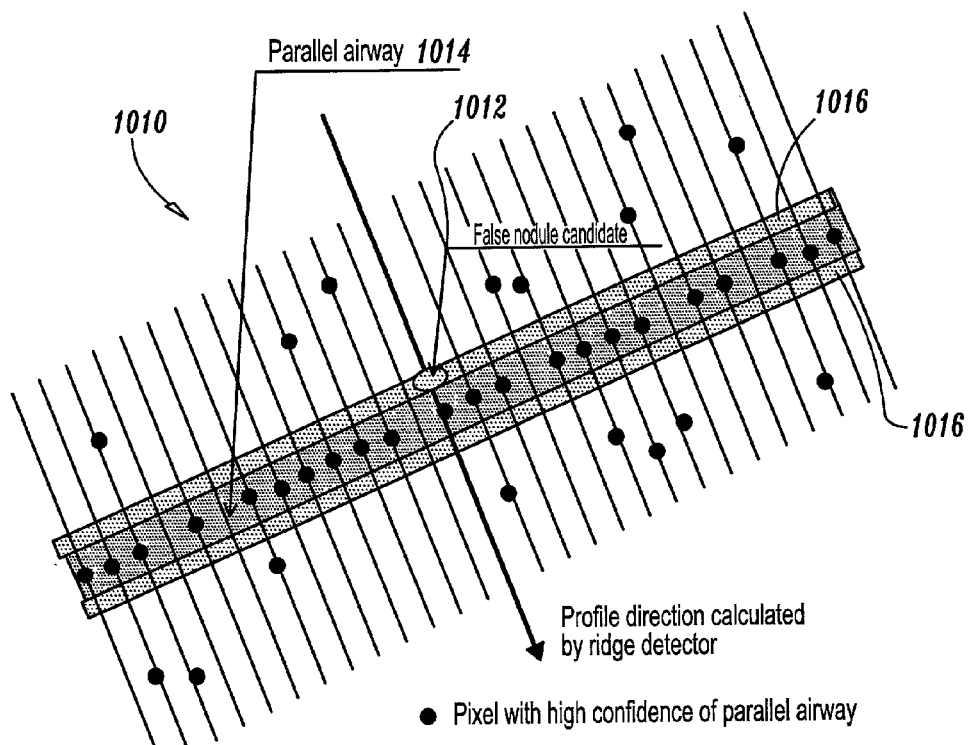
FIG. 10 shows a schematic diagram illustrating profile extraction and connection of high-confidence pixels in the parallel test.

Turning now to FIG. 10, the profile extraction and connection of high-confidence pixels in the parallel test is indicated generally by the diagram 1010. In order to detect parallel airways, a ridge detector is used to calculate the perpendicular direction to the airway wall 1016 of the parallel airway 1014 with the nodule candidate 1012. Then, profiles parallel to the direction from the ridge detector are extracted. The profiles are analyzed to assign the parallel wall existence confidence to the middle pixel of the airway-like segments on the profiles.

Figure 11:
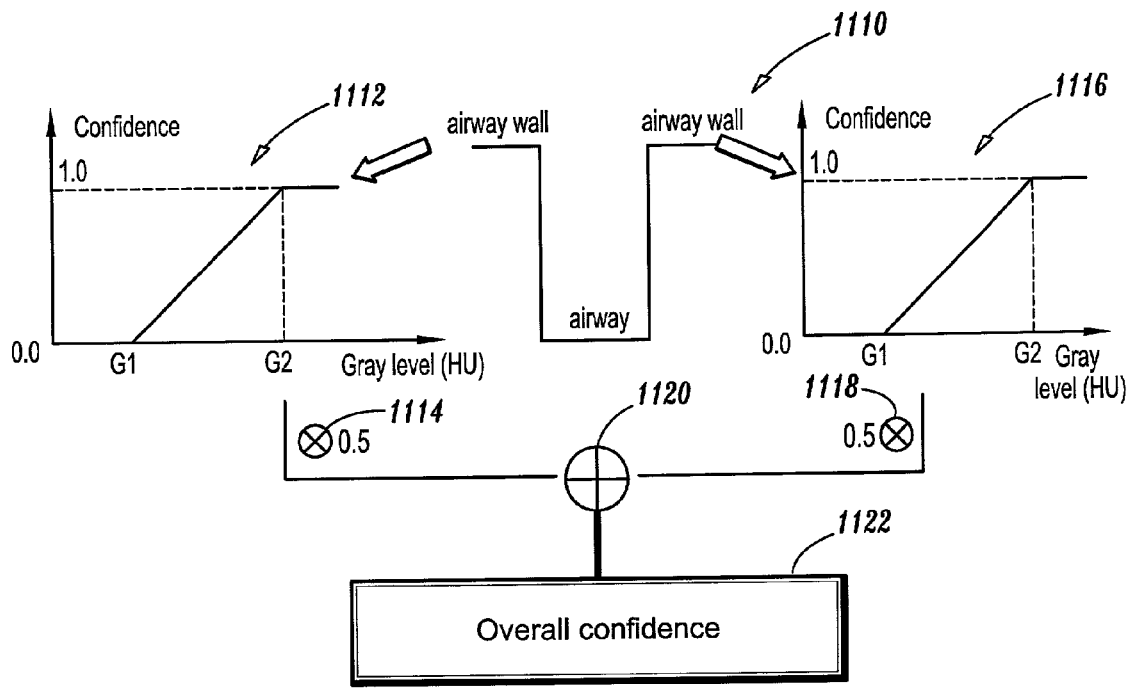
FIG. 11 shows a flow diagram for determining the overall confidence for a parallel airway.

As shown in FIG. 11, a parallel airway wall confidence calculator 1110 has a first gray level confidence function 1112 for determining the confidence in a first airway wall section and weighting the result by a factor at a multiplier 1114. This weighting factor is approximately 0.5 in this exemplary embodiment, although other comparable values may be used in alternate embodiments. A second gray level confidence function 1116 determines the confidence in a second airway wall section, and this result is weighted by a factor at a multiplier 1118. This weighting factor is approximately 0.5 in this exemplary embodiment, although other comparable values may be used in alternate embodiments. A summing function 1120 receives the products of multipliers 1114 and 1118, and supplies the sum to an overall confidence function 1122 for determining the overall confidence for the pair of airway walls.

Figure 12:
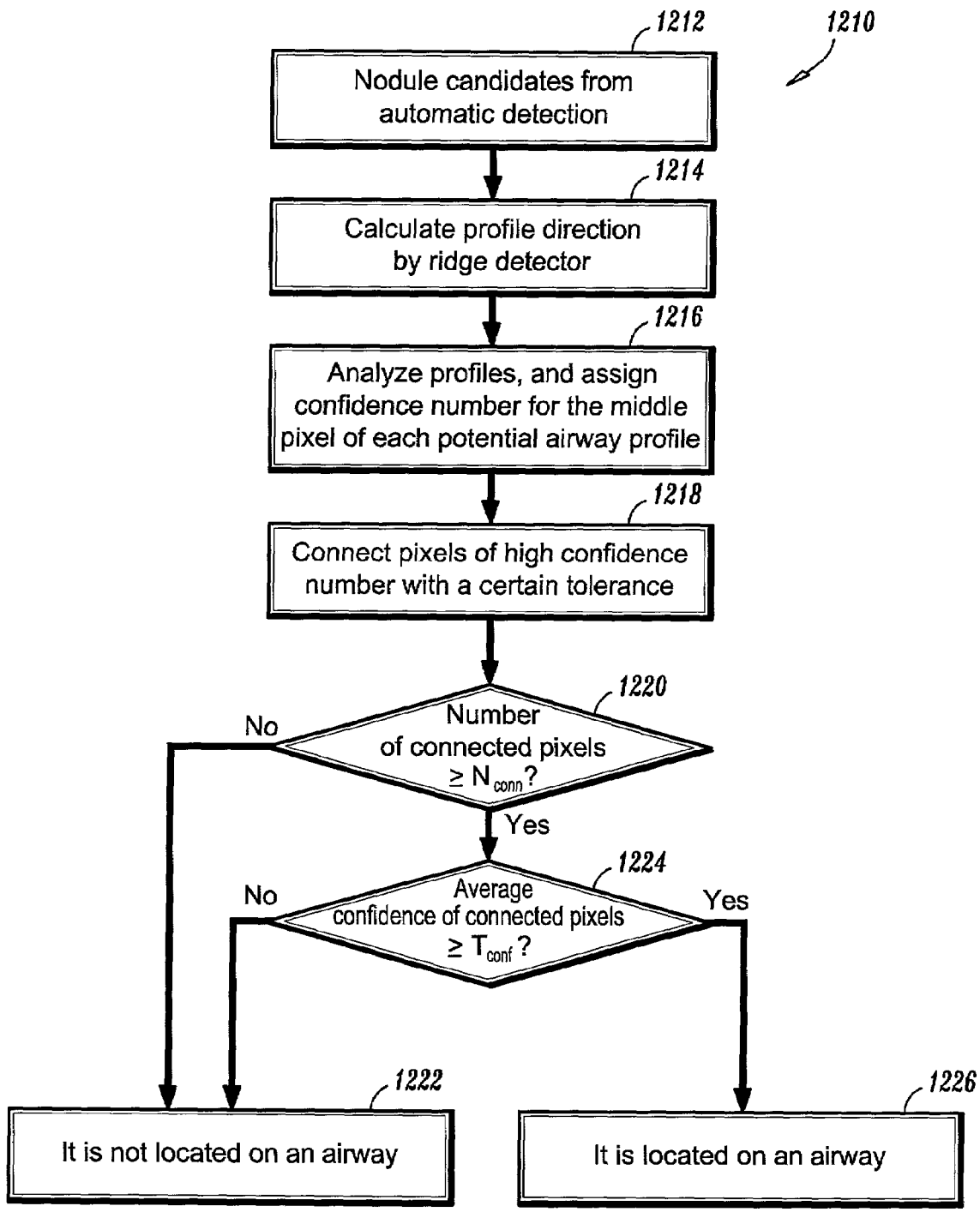
FIG. 12 shows a flow diagram for performing a parallel test to detect airways.

Turning now to FIG. 12, a flow diagram 1210 of the parallel test for airway detection includes a function block 1212 for receiving preferably automatically detected nodule candidates, which feeds a function block 1214. The function block 1214 calculates a profile direction with a ridge detector, and feeds a function block 1216. The function block 1216 analyzes profiles and assigns confidence numbers for the middle pixel of each potential airway profile. A function block 1218 follows block 1216, connects pixels of high confidence number within a range of tolerance, and feeds decision block 1220. Decision block 1220 compares the number of connected pixels with a threshold $N_{conn}$. If the number of connected pixels is less than $N_{conn}$, function block 1222 determines that the pixel is not located on an airway. If the number of connected pixels is greater than or equal to $N_{conn}$, decision block 1224 compares the average confidence of the connected pixels with a threshold $T_{conf}$. If the average confidence is less than $T_{conf}$, function block 1222 determines that the pixel is not located on an airway. If the average confidence is not less than $T_{conf}$, function block 1226 determines that the pixel is located on an airway.

Thus, the parallel wall existence confidence is calculated from the gray level values of the both sides of a dark piece on the profiles. After confidence number calculation, pixels with high confidence numbers are connected into a contiguous line or curve with a certain tolerance, and a decision is made that the nodule candidate is located on a parallel airway.

Figure 13:
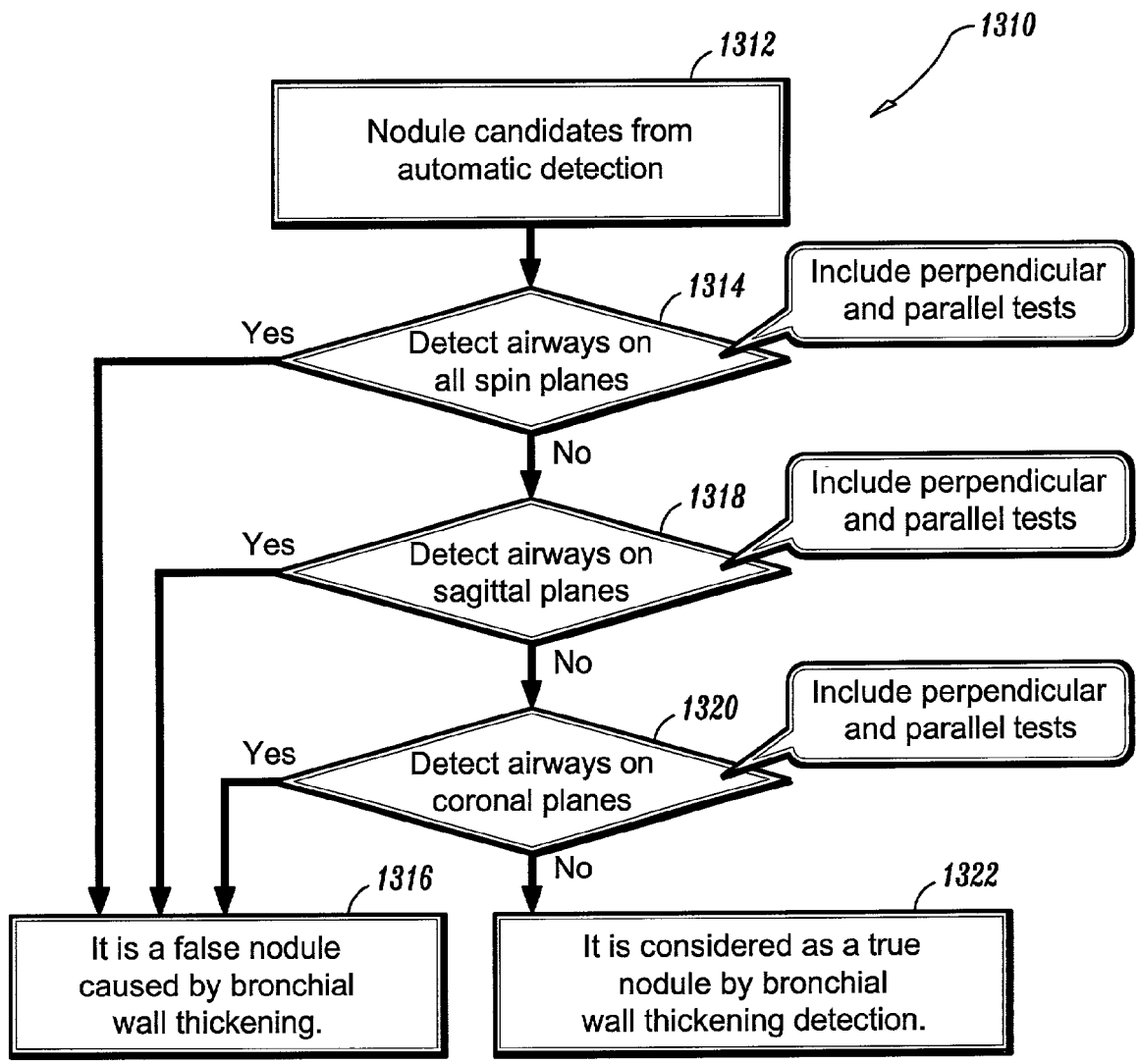
FIG. 13 shows a flow diagram for detecting airways on examination planes.

As shown in FIG. 13, airway tests may be performed on different viewing planes. The flow diagram 1310 detects airways for nodule candidates on different spin planes, sagittal planes, and coronal planes. A function block 1312 receives nodule candidates, preferably from an automatic detector, and passes control to a decision block 1314. The decision block 1314 detects airways on all spin planes by perpendicular and parallel testing, and passes control to function block 1316 if a corresponding airway is detected. Function block 1316 determines that the nodule candidate is a false nodule caused by bronchial wall thickening. If decision block 1314 does not detect an airway, it passes control to decision block 1318, which detects airways on sagittal planes using both perpendicular and parallel testing. If block 1318 detects an airway, it passes control to function block 1316, as above. However, if it does not detect an airway, it passes control to decision block 1320 to detect airways on coronal planes. If decision block 1320 detects an airway, it passes control to function block 1316, as above. If decision block 1320 does not detect an airway either, it passes control to a function block 1322, which determines that the nodule candidate is considered to be a true nodule candidate upon bronchial wall thickening detection.

Thus, if airway branches are only viewed on transverse scan planes, their gray level or geometric features may not be good enough to be recognized by either perpendicular test or parallel test in some cases. However, if we spin transverse planes with different angles or view the airway branches on sagittal or coronal planes, the airways would be much easier to be captured by the perpendicular or parallel test on some of the viewing planes. For different viewing planes except transverse slices, due to anisotropy in X, Y, and Z directions and the artifacts introduced by interpolation, more strict constraints are preferably used in the perpendicular or parallel tests to identify airways.

If either the perpendicular test or the parallel test determines that a nodule candidate is located on an airway on any of the viewing planes, the nodule candidate is considered as a false-positive caused by bronchial wall thickening, phlegm, or dirt accumulated at an airway bifurcation point.

The final outputs of this system can be either directly provided to physicians on the display devices by visually marking the false-positive lung nodules, by providing the list of detected false-positives to a CAD system to automatically remove the false-positives and to improve the overall diagnostic accuracy of such CAD systems, or by providing an updated list of true candidates to a nodule detection system, such as, for example, one described in co-pending Ser. No. 10/008,119 Vessel-Feeding Pulmonary Nodule Detection By Volume Projection Analysis".

In operation, the present disclosure teaches automatically filtering false-positive nodule candidates resulting from bronchial wall thickening and related phenomenon from CT images so that radiologists and physicians can be freed from the heavy burden of reading through multitudes false-positive nodule candidates. An advantage of the present disclosure is the provided sensitivity to pulmonary nodules while maintaining low false-positive rates. Usually, pulmonary nodules appear in slice images as nearly circular-shaped opacities, which are similar to cross-sections of vessels. Accordingly, many existing recognition methods have a high false-positive rate. The present disclosure solves this problem by detecting airways and their associated false-positive nodule candidates. It shall be understood that, although exemplary embodiments have been described with reference to CT imaging, the present disclosure is also applicable to other types of imaging, such as, for example, to magnetic resonance imaging ("MRI").

It is to be understood that the teachings of the present disclosure may be implemented in various forms of hardware, software, firmware, special purpose processors, or combinations thereof. Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which is executed via the operating system. In addition, various other peripheral units may be connected to the computer platform such as an additional data storage unit and a printing unit.

It is to be further understood that, because some of the constituent system components and method function blocks depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be affected therein by one of ordinary skill in the pertinent art without departing from the scope or spirit of the present disclosure. All such changes and modifications are intended to be included within the scope of the present disclosure as set forth in the appended claims.

What is claimed is:

1. A method for automatically reducing false-positive nodule candidates associated with airways, the method comprising:
   receiving a nodule candidate;
   testing for airway cavities connected to said candidate; and
   recognizing said candidate as a false-positive nodule candidate if it is connected to an airway cavity,
   wherein said testing comprises:
   perpendicular testing for airways that are relatively perpendicular to an examination plane; and
   parallel testing for airways that are relatively parallel to an examination plane,
   wherein said perpendicular testing comprises:
   defining a region of interest comprising the nodule candidate;
   thresholding the pixels within the region of interest;
   connecting the thresholded pixels corresponding to a potential airway cavity; and
   performing compactness and area tests on the potential airway cavity and classifying the candidate as true if an airway having sufficient compactness and area is not detected.

2. A method as defined in claim 1 wherein said examination plane is a viewing plane comprising one of a spin plane, a sagittal plane, or a coronal plane.

3. A method as defined in claim 1 wherein the threshold value for airway lumens is about −874 HU for computed tomography images.

4. A method as defined in claim 1 wherein said perpendicular testing further comprises:
   performing an airway wall existence test for a potential airway cavity having sufficient compactness and area; and
   classifying the candidate as true if the airway wall existence has a weak probability or false if the existence has a strong probability.

5. A method as defined in claim 4 wherein:
   the probability is strong if the ratio of the number of airway wall pixels over the total number of outer boundary pixels is greater than about 80%; and
   the probability is weak if the ratio of the number of non-wall pixels over the total number of outer boundary pixels is greater than about 50%.

6. A method as defined in claim 4 wherein said airway wall existence test comprises checking for pixels having gray levels between about 224 and 424 HU for computed tomography images.

7. A method as defined in claim 4 wherein said perpendicular testing further comprises:
   performing an adjacent vessel test for a potential airway cavity having a medium probability of airway wall existence; and
   classifying the candidate as true if there is no adjacent vessel detected or false if there is an adjacent vessel detected.

8. A method as defined in claim 7 wherein said adjacent vessel test comprises measuring distances between vessels and the potential airway cavity.

9. A method as defined in claim 7 wherein said adjacent vessel test comprises checking for adjacent vessels between about 2.5 mm and 4.5 mm from the potential airway cavity.

10. A method for automatically reducing false-positive nodule candidates associated with airways, the method comprising:
    receiving a nodule candidate;
    testing for airway cavities connected to said candidate; and
    recognizing said candidate as a false-positive nodule candidate if it is connected to an airway cavity,
    wherein said testing comprises;
    perpendicular testing for airways that are relatively perpendicular to an examination plane; and
    parallel testing for airways that are relatively parallel to an examination plane,
    wherein said parallel testing comprises:
    determining a profile direction by ridge detection;
    assigning a confidence number for the middle pixel of each potential airway profile;
    connecting pixels having high confidence numbers and deciding that the candidate is not located on an airway if the number of connected pixels is less than a threshold;
    calculating the average confidence level of the connected pixels to decide that the candidate is not located on an airway if the average confidence level of the connected pixels is less than a threshold or that the candidate is located on an airway if the average confidence level of the connected pixels is not less than a threshold.

11. A method as defined in claim 10 wherein the threshold value for average confidence level is about 75%.

12. A method as defined in claim 10 wherein said testing further comprises:
    testing all spin planes to detect an airway;
    testing sagittal planes to detect an airway; and
    testing coronal planes to detect an airway.

13. A system for automatically reducing false-positive nodule candidates associated with airways, the system comprising:
    means for receiving a nodule candidate;
    means for testing for airway cavities connected to said candidate, and
    means for recognizing said candidate as a false-positive nodule candidate if it is connected to an airway cavity,
    wherein said means for testing comprises:
    means for perpendicular testing for airways that are relatively perpendicular to an examination plane; and
    means for parallel testing for airways that are relatively parallel to an examination plane, wherein said means for perpendicular testing comprises:
means for defining a region of interest comprising the nodule candidate;
means for thresholding the pixels within the region of interest;
means for connecting the thresholded pixels corresponding to a potential airway cavity; and
means for performing compactness and area tests on the potential airway cavity and means for classifying the candidate as true if an airway having sufficient compactness and area is not detected.

14. A system as defined in claim 13 wherein said means for perpendicular testing further comprises:
means for performing an airway wall existence test for a potential airway cavity having sufficient compactness and area; and
means for classifying the candidate as true if the existence has a weak probability or false if the existence has a strong probability.

15. A system as defined in claim 14 wherein said means for perpendicular testing further comprises:
means for performing an adjacent vessel test for a potential airway cavity having a medium probability of airway wall existence; and
means for classifying the candidate as true if there is no adjacent vessel detected or false if there is an adjacent vessel detected.

16. A system for automatically reducing false-positive nodule candidates associated with airways, the system comprising:
means for receiving a nodule candidate;
means for testing for airway cavities connected to said candidate; and
means for recognizing said candidate as a false-positive nodule candidate if it is connected to an airway cavity,
wherein said means for testing comprises:
means for perpendicular testing for airways that are relatively perpendicular to an examination plane; and
means for parallel testing for airways that are relatively parallel to an examination plane,
wherein said means for parallel testing comprises:
means for determining a profile direction by ridge detection;
means for assigning a confidence number for the middle pixel of each potential airway profile;
means for connecting pixels having high confidence numbers and deciding that the candidate is not located on an airway if the number of connected pixels is less than a threshold;
means for calculating the average confidence level of the connected pixels to decide that the candidate is not located on an airway if the average confidence level of the connected pixels is less than a threshold or that the candidate is located on an airway if the average confidence level of the connected pixels is not less than a threshold.

17. A system as defined in claim 16 wherein said means for testing further comprises:
means for testing all spin planes to detect an airway;
means for testing sagittal planes to detect an airway; and
means for testing coronal planes to detect an airway.

18. A computer readable medium encoded with a computer program embodying a program of instructions executable by a computer to perform method steps for automatically reducing false-positive nodule candidates associated with airways, the method steps comprising:
receiving a nodule candidate;
testing for airway cavities connected to said candidate; and
recognizing said candidate as a false-positive nodule candidate if it is connected to an airway cavity,
wherein said testing comprises:
perpendicular testing for airways that are relatively perpendicular to an examination plane; and
parallel testing for airways that are relatively parallel to an examination plane,
wherein said perpendicular testing comprises:
defining a region of interest comprising the nodule candidate;
thresholding the pixels within the region of interest;
connecting the thresholded pixels corresponding to a potential airway cavity; and
performing compactness and area tests on the potential airway cavity and classifying the candidate as true if an airway having sufficient compactness and area is not detected.

19. A computer readable medium as defined in claim 18 wherein said perpendicular testing further comprises:
performing an airway wall existence test for a potential airway cavity having sufficient compactness and area; and
classifying the candidate as true if the existence has a weak probability or false if the existence has a strong probability.

20. A computer readable medium as defined in claim 19 wherein said perpendicular testing further comprises:
performing an adjacent vessel test for a potential airway cavity having a medium probability of airway wall existence; and
classifying the candidate as true if there is no adjacent vessel detected or false if there is an adjacent vessel detected.

21. A computer readable medium encoded with a computer program embodying a program of instructions executable by a computer to perform method steps for automatically reducing false-positive nodule candidates associated with airways, the method steps comprising:
receiving a nodule candidate;
testing for airway cavities connected to said candidate; and
recognizing said candidate as a false-positive nodule candidate if it is connected to an airway cavity,
wherein said testing comprises:
perpendicular testing for airways that are relatively perpendicular to an examination plane; and
parallel testing for airways that are relatively parallel to an examination plane,
wherein said parallel testing comprises:
determining a profile direction by ridge detection;
assigning a confidence number for the middle pixel of each potential airway profile;
connecting pixels having high confidence numbers and deciding that the candidate is not located on an airway if the number of connected pixels is less than a threshold;
calculating the average confidence level of the connected pixels to decide that the candidate is not located on an airway if the average confidence level of the connected pixels is less than a threshold or that the candidate is located on an airway if the average confidence level of the connected pixels is not less than a threshold.

22. A computer readable medium as defined in claim 21 wherein said testing further comprises:
testing all spin planes to detect an airway;
testing sagittal planes to detect an airway; and
testing coronal planes to detect an airway.

* * * * *